United States Patent [19]

van der Lely

[11] 4,050,519

[45] Sept. 27, 1977

[54] SOIL CULTIVATING MACHINES

[76] Inventor: Cornelis van der Lely, 7, Bruschenrain, Zug, Switzerland

[21] Appl. No.: 620,920

[22] Filed: Oct. 9, 1975

[30] Foreign Application Priority Data

Oct. 10, 1974 Netherlands ............................ 7413313

[51] Int. Cl.² .................... A01B 33/06; A01B 33/14
[52] U.S. Cl. ........................................ 172/49; 172/53;
172/91; 172/100; 172/102; 172/111; 172/713;
172/736; 172/748; 172/762; 172/771
[58] Field of Search ...................... 172/49-55,
172/59, 91, 92, 94, 95, 97, 100, 102, 110, 111,
522-526, 555, 604, 713, 734, 736, 748, 762, 763,
765, 771

[56] References Cited

U.S. PATENT DOCUMENTS

| 75,310 | 3/1868 | Standish | 172/59 X |
| 222,500 | 12/1879 | Hughes | 172/748 X |
| 780,609 | 1/1905 | Hoffert | 172/748 X |
| 937,607 | 10/1909 | Hoover | 172/526 |
| 3,667,551 | 6/1972 | van der Lely et al. | 172/59 |
| 3,774,689 | 11/1973 | van der Lely et al. | 172/522 X |
| 3,809,166 | 5/1974 | van der Lely et al. | 172/763 |
| 3,823,780 | 7/1974 | Guerin | 172/53 X |

FOREIGN PATENT DOCUMENTS

| 69,803 | 11/1892 | Germany | 172/526 |
| 1,557,789 | 1/1970 | Germany | 172/100 |
| 847,413 | 9/1960 | United Kingdom | 172/523 |
| 646,318 | 11/1950 | United Kingdom | 172/97 |

Primary Examiner—Paul E. Shapiro
Attorney, Agent, or Firm—Mason, Mason & Albright

[57] ABSTRACT

A soil cultivating machine has soil working members that are driven about upwardly extending axes. Each working member has radial arms and a tined cultivating rotor is pivotably connected to the outer end of each arm. Each cultivating rotor is freely rotatable about an upwardly extending axis and an adjustment device can be set to vary the position of the cultivating rotor about the pivot connection to its corresponding arm to change the working positions of the tines. The cultivating rotor can use different tines depending on the condition of the ground being worked.

15 Claims, 7 Drawing Figures

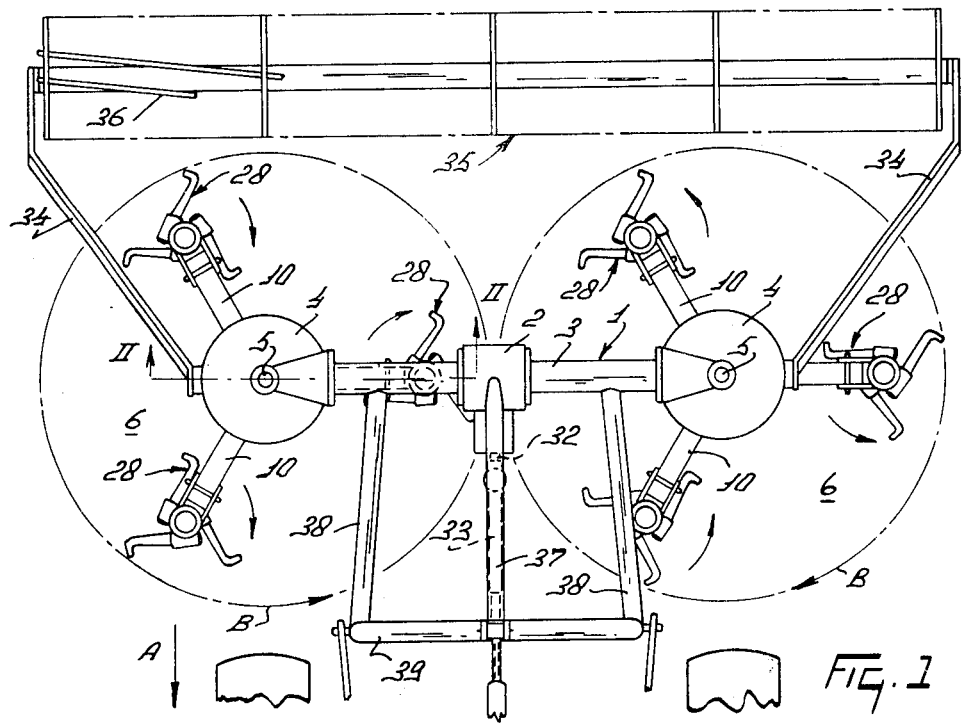
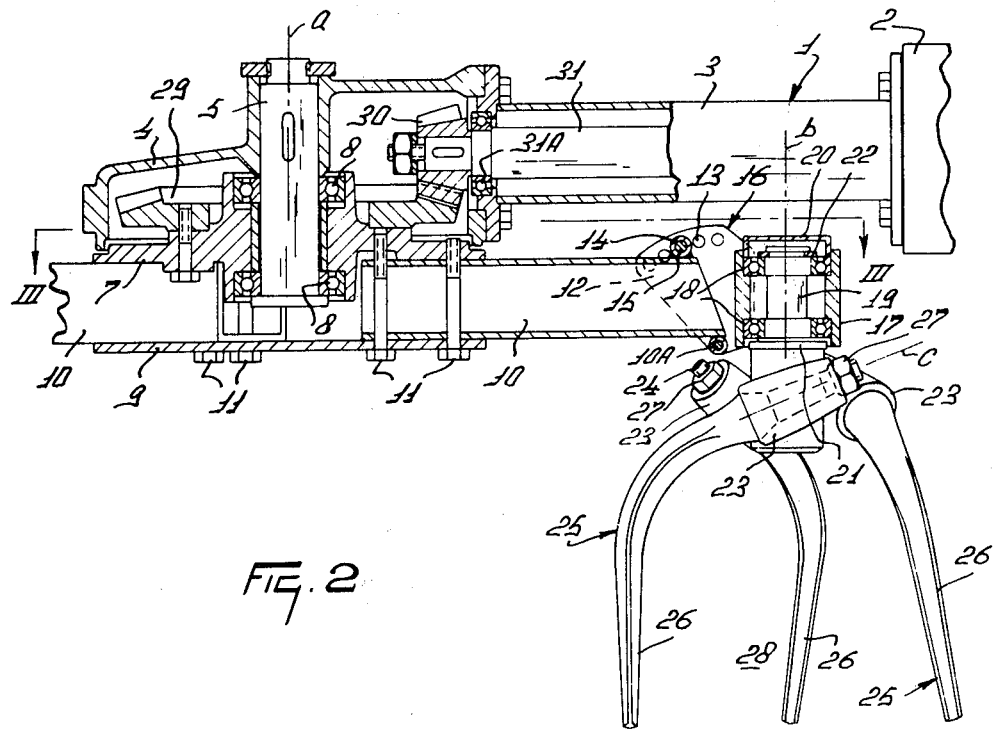

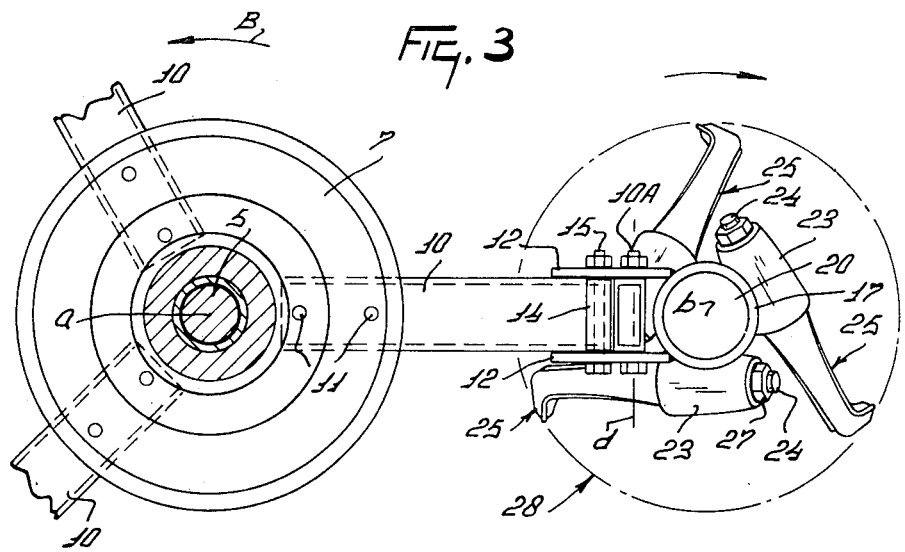
Fig. 3
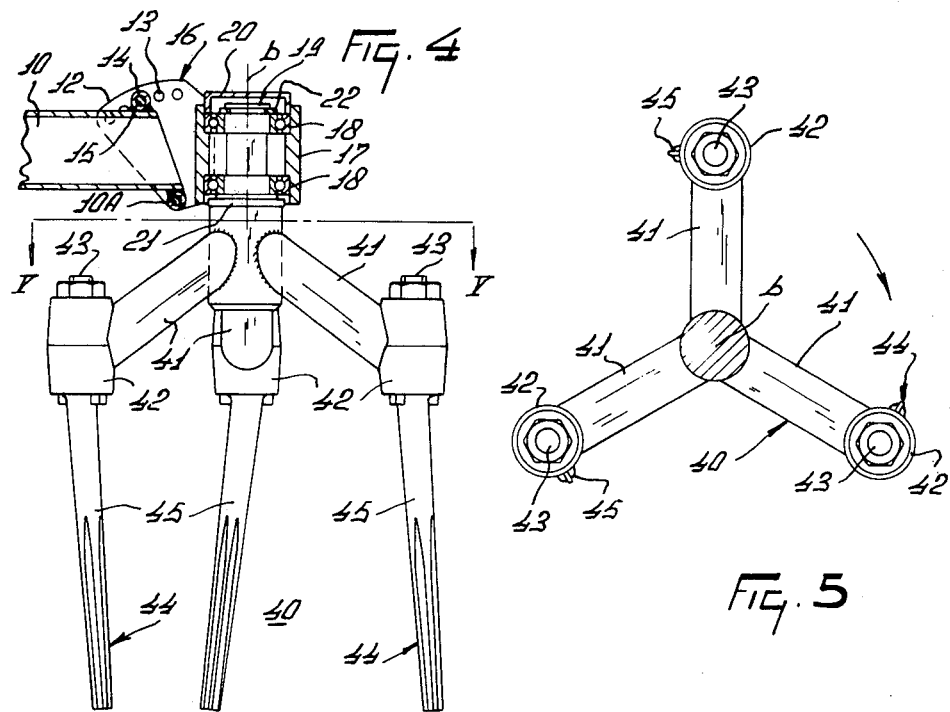
Fig. 4
Fig. 5

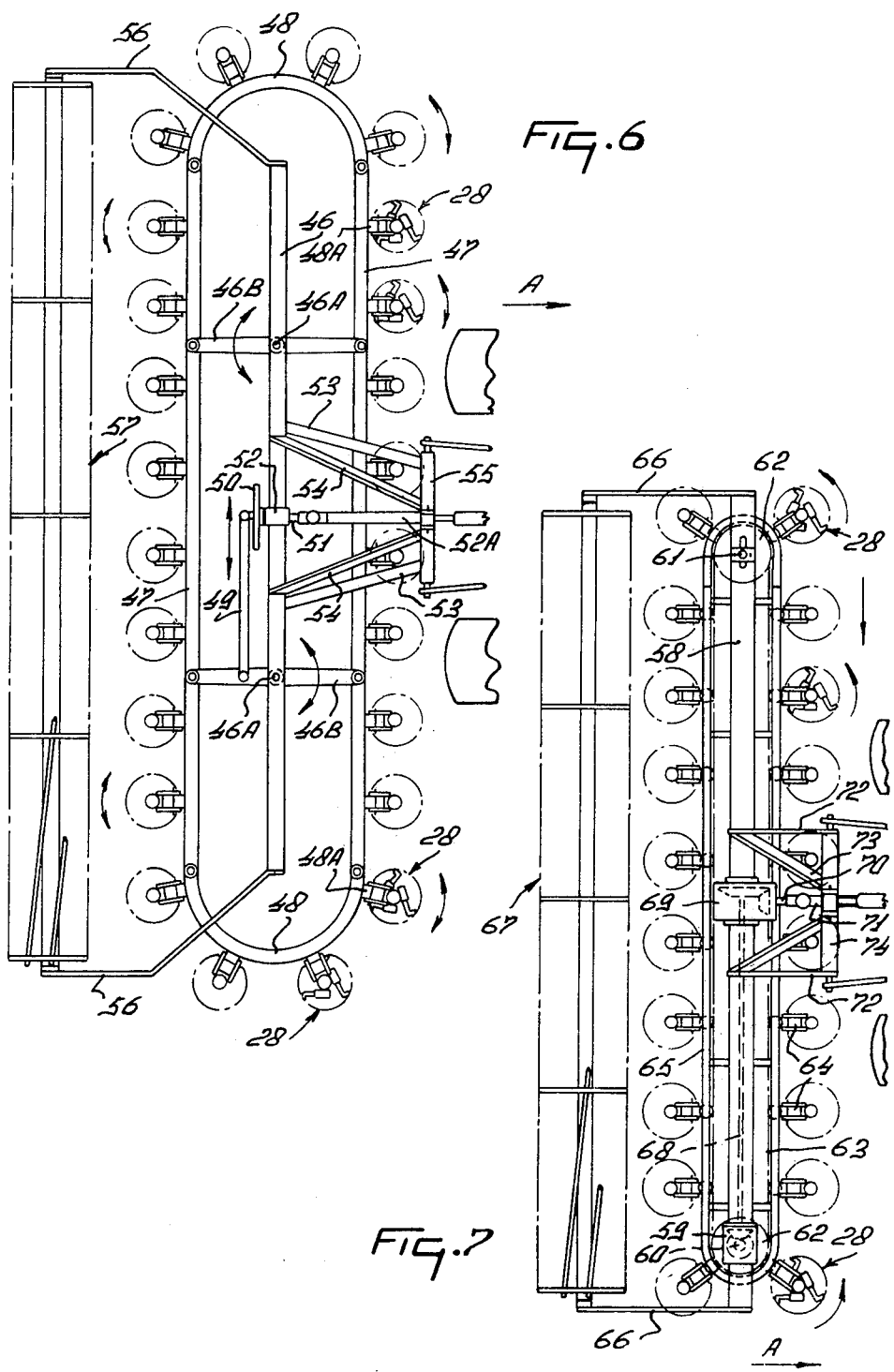

SOIL CULTIVATING MACHINES

This invention relates to soil cultivating machines.

Soil cultivating machines are known that have soil cultivating means occupying a fixed position with respect to a shaft about which is driven a working member that has the soil cultivating means attached to it. In such a machine there is no provision for matching various conditions and different kinds of soil.

According to the present invention there is provided a soil cultivating machine comprising at least one working member arranged in operation to be driven about a shaft and provided with at least one soil cultivating means that is arranged on the working member so as to be locatable and fixable in any of two or more positions in each of which it is freely rotatable. By arranging the cultivating means on the working member so as to be freely rotatable and so as to be locatable and fixable in any of two or more positions the operative speed of movement of the cultivating means can be adapted to the prevailing conditions and the kind of soil to be cultivated so that an effective cultivation of the soil is facilitated.

For a better understanding of the invention and to show how the same may be carried into effect, reference will now be made, by way of example, to the accompanying drawings in which:

FIG. 1 is a plan view of a soil cultivating machine shown hitched to a tractor and in which a working member of the machine is provided with a plurality of identical soil cultivating means, FIG. 2 is an enlarged elevational view of a detail taken on the line II—II in FIG. 1 and illustrating one of the soil cultivating means, FIG. 3 is a sectional view taken on the line III—III in FIG. 2, FIG. 4 is a side view illustrating an alternative soil cultivating means, that replace that illutrated in FIGS. 1 to 3, FIG. 5 is a plan view taken on the line V—V in FIG. 4 of the second of the soil cultivating means, FIG. 6 is a plan view of a second form of soil cultivating machine, and FIG. 7 is a plan view of a third form of soil cultivating machine.

The soil cultivating machine shown in FIGS. 1 to 5 has a frame that includes a frame beam 1, extending transversely of the intended direction of operative travel A of the machine. The frame beam 1 includes tubes 3 on either side of a gear box 2 and joined to this gear box by means of flanges. At their ends remote from the gear box 2 these tubes 3 are fastened by means of flanges to gear boxes 4. Within each of the gear boxes 4 is journalled an upright shaft 5 (FIG. 2). A rotor forming a working member 6 is rotatably arranged about the longitudinal center line $a$ of each shaft 5. Each working member 6 has a central flange 7 which is rotatable about the shaft 5 by means of ball bearings 8 spaced apart in superimposed positions. The flange 7 closes the bottom of each gear box 4. Between the flange 7 and a plate 9 three straight, hollow, radial arms 10 are held by bolts 11 at circumferential angles of about 120° from one another. The arms 10 have a rectangular, preferable square section. At its free end each arm 10 (FIG. 2) is bevelled so that its bottom edge is more remote from the shaft 5 than its top edge.

Beneath the bottom edge of the free end of each arms 10 there is a bolt 10A about which on either side of the arm 10 upright plates 12 are rotatable by their lower ends. The plates 12 extend at their upper ends to above the arms 10. Near their top edges the plates 12 have each a row of holes 13 located on an arc of a circle having its centers located on the longitudinal center line of the associated bolt 10A. Above the top edge of each arm 10 there is a sleeve 14 through which is passed a bolt 15 which is also passed through any selected one of the holes 13 in each of the plates 12 associated with the arm. Together with the bolts 10A and 15 the plates 12 consitute and adjusting device 16. Beyond the free ends of the arms 10 the plates 12 are slightly bent over towards one another to embrace a sleeve 17 (FIG. 3) that is fast with the plates 12 and extends in an upward direction. By means of superimposed ball bearings 18 the sleeve 17 holds a freely rotatable shaft 19 which projects from the bottom of the sleeve 17. In the position of the plates 12 shown in FIG. 2, the rotary axis of the working member 6, formed by the longitudinal center line $a$ of the shaft 5, is parallel to the longitudinal center line $b$ of the shaft 19. The top end of the shaft 19 is covered by a cap 20, which is slipped into the top end of the sleeve 17. The shaft 19 has a shoulder 21, which is located near the lower bearing 18, whereas at the top a circlip 22 bearing on the upper bearing 18 locks the shaft 19 in place so that it is not displaceable in its direction of length with respect to the sleeve 17. The lower end of the shaft 19 is of increased diameter outside the sleeve 17 and carries three equally spaced holders 23 receiving end portions 24 of tines 25.

Each holder 23 has a recess extending in the direction of length thereof and having a longitudinal center line $c$ lying as viewed in plan (FIG. 3) in a plane extending tangentially to a circle centered on the longitudinal center line $b$ of the shaft 19, this plane crossing the longitudinal center line $b$ at an acute angle as viewed at right angles (FIG. 2) to the shaft 19, the sides of this angle being orientated in downward direction. Each of the tine portions 24 received in respective holders 23 has its longitudinal center line coincident with the longitudinal centre line $c$ of the recess of its holder 23. The end portions 24 of each tine 25 extends from the operative portion 26 of the tine. The operative portion 26 initially extends in line (as viewed in plan) with the end portions 24, passes through a curved part and terminates in a downwardly extending, straight part. The straight part of the operative portion 26 has, away from its upper end, such a shape that this part is at an angle to a plane going through the longitudinal center line of the end portion 24 and parallel to the longitudinal centre line $b$ of the shaft 19 (see FIG. 3). The straight part of the operative portion 26 tapers inwardly in downward direction and has an angular cross-section. The lines of connection between opposite corners of this angular cross-section have different lengths and the longer one is tangential to a circle centered on the longitudinal center line $b$ of the shaft 19. Recesses are provided between the corners. Each end portion 24 is held in its holder 23 by means of two conical parts and a nut 27 screwed onto a screwthreaded, free end. Each shaft 19 with its three tines 25 constitutes a three-tined soil cultivating means 28, which is freely rotatable with respect to its working member 6 about the rotary axis formed by the longitudinal center line $b$ of the shaft 19. The tines 25 are constructed and arranged so that their top ends partly formed by the end portions 24, viewed from the side, are orientated in the direction of the rotary axis b of the cultivating means so that, viewed from the side, the cultivating means exhibits approximately the shape of a cone (FIG. 2).

Each cultivating means 28 can be changed over to and fixed in any one of five positions utilising the adjusting device 16, by turning it about the longitudinal center line d of the bolt 10A, forming a pivotal axis. The pivotal axis d, about which the cultivating means can turn through an overall angle of about 40° with respect to the rotary axis a of the working member 6, extend tangentially and, as stated above, it crosses this rotary axis a at an angle of at least substantially 90°.

The distance between the rotary axis b' of each cultivating means 28 and the rotary axis a of its working member 6 is about 40 cams and the cultivating means 28 of adjacent working members 6 work strips of soil about 30 cms wide, which overlap one another.

For driving the respective working members 6 each flange 7 has a bevel gear wheel 29 located in the gear box 4 and co-operating with a bevel gear wheel 30 on a shaft 31 extending in the direction of length of the frame beam 1 disposed within the tubular parts 3 and in the gear box 2. The shaft 31 is supported in ball bearing 31A in the walls of the gear boxes 4 and 2. Inside the gear box 2 the shaft 31 is drivably connected by means of a bevel gear wheel transmission (not shown) with a shaft 32 projecting from the front of the gear box, extending in the direction of travel A and coupled through an auxiliary shaft 33 with the power take-off shaft of a tractor.

At the ends of the frame beam 1 arms 34 extending rearwardly and inclined downwardly hold a working member 35 extending tranversely of the direction of travel A and adapted to rotate about a substantially horizontal axis. The working member 35 includes a plurality of elongated elements 36 located around its periphery and extending in the direction of the rotary axis. Although this is not shown in detail the arms 34 may be pivotally arranged at the ends of the frame beam 1 and there may be provided adjusting mechanism for setting the arms in any selected one of a plurality of positions so that with the aid of the working member 35 the working depth of the soil cultivating means 28 of the respective working members 6 can be adjusted.

In operation the machine described above is attached to the three-point lift of the tractor by means of a trestle 39 carries on the frame beam 1 with the aid of supports 37 and 38, and the working members 6 are driven about upright shafts i.e. the longitudinal center lines a of the shafts 5 in opposite directions indicated by the arrows B in FIG. 1 through the driving gear described above. During the rotation of the working members 6 the soil cultivating means 28 are rotated by the ground contact of their tines 25 about the rotary axis formed by the longitudinal center line b of the shaft 19 so that they rotate in the directions indicated by arcuate arrows. Since at least three tines are provided in each of the cultivating means 28, the operative tine portions 26 successively penetrating into the un-worked soil ensure a regular rotation, the respective operative portions of the tines being in dragging or trailing positions relative to the un-worked soil with respect to the direction of rotation. The tapering operative tine portions having an angular cross-section and having recesses in the sides between the corners provide an effective crumbling along the natural fractural lines of the soil, while in addition a uniform distribution of the worked depth is obtained. By means of the elongated elements 36 of the working members 35, extending transversely of the direction of travel A and adapted to rotate about a substantially horizontal axis, the worked strip of soil can be subsequently worked in a manner conductive to the condition of the top layer of the seed bed.

By means of the adjusting device 16 the respective soil cultivating means 28 can be set in different positions with respect to their working members 6 about an axis d extending substantially tangentially to a circle centered on the rotary axis a of the working member 6 and crossing this axis substantially at an angle of 90°. At the same time the position of the rotary axis of the soil cultivating means, formed by the longitudinal center line b of its shaft 19, is changed so that the speed of rotation of the cultivating means in operation can be varied. Thus the position of the rotary axis can be set for any condition and any kind of soil. The axis d is nearer the axis a than the axis b. It will be appreciated that the rotary axes of the respective cultivating means 28 may be arranged at different angles to one another.

The soil cultivating means 40 shown in FIGS. 4 and 5 has three arms 41 fastened to the projecting, increased diameter, lower end of the shaft 19 and having a stright shape extending radially of the shaft 19, the arms being at equal cirumferential angles to one another. Viewed from the side, the arms 41 are inclined downwards away from their fastening points to the shaft 19 and their longitudinal center lines are at an angle of at least 30° to the longitudinal center line b of the shaft 19. The free end of each arm 41 is provided with a holder 42 in which an end portion 43 of a tine 44 is fixed by means of a nut. The longitudinal center line of the end portion 43 extends substantially parallel to the longitudinal center line b of the shaft 19. The tine 44 has an operative portion 45 extending from the end portion, the longitudinal center line of the operative portion being at an angle of preferable about 8° to the longitudinal center line of the end portion.

In operation which the cultivating means 40 replacing the cultivating means 28, the cultivating means 40 are driven in the same direction as already described for the cultivating means 28. The operative portion 45 of each tine 44 is in a trailing a dragging position relative to the direction of operative rotation (FIG. 5). The treatment of the soil by the cultivating means 40 corresponds in general with that of the cultivating means 28. However, owing to the specific shape of the tines the cultivating means 40 are better suitable for use on grounds heavily contaminated by weeds.

FIG. 6 shows a soil cultivating machine in the form of a reciprocating harrow having a frame beam 46 extending transversely of the intended direction of operative travel A of the machine and provided at equal distances from its ends with upright stub shafts 46A. Arms 46B extending substantially in the direction of travel A are pivotally arranged around the stub shafts 46A and near the front and rear ends each of these arms is pivotally connected with elongated working members 47 in the form of beams extending transversely of the direction of travel A and substantially parallel to the frame beam 46. The elongated working members 47 are pivoted near their ends by means of stub shafts to outwardly convex bent-over connecting members 48. At equal intervals soil cultivating means 28 (or 40) as already described are mounted, on supports, on the beams formed by the elongated working members 47 and the connecting members 48. The cultivating means can be readily adjusted and exchanged. For example only cultivating means 28 can be fitted, or only cultivating means 40, or a combinations for example means 28 alternating with means 40.

The relative distances between the cultivating means 28 (or 40) on the respective members 47 and on the connecting members 48 are the same, and the distance between a cultivating means on a member 47 and an adjacent cultivating means on a connecting member 48 is also equal to said relative distances.

The right-hand arm 46A, viewed from the rear in the direction of travel A, is pivotally connected at a distance behind the stub shaft 46A on the frame beam 46 with one end of an arm 49 whose other end is pivoted to a stub shaft or a crank disc 50 on a shaft 51 extending in the direction of travel A. The shaft 51 is supported in a bearing 52 on the top of the frame beam 46. The front end of the shaft 51, which is located substantially near the center of the frame beam 41, is connected as illustrated via an auxiliary shaft 52 with the power take-off shaft of a tractor. By means of supports 53 and 54 a trestle 55 is carried on the frame beam 46 for attaching the machine to the three-point lift of the tractor.

At the ends of the frame beam 46 rearwardly extending arms 56 are inclined in downward direction and hold between them a working member 57, adapted to rotate about a substantially horizontal axis and extending tranversely of the direction of travel A, the construction of this member being identical to that of the working member 35 already described.

In operation the arms 46B are moved to and fro about the upright shafts 46A via the auxiliary shaft 52A and the crank mechanism 49, 50, and the elongated working members 47, located one behind the other, thus perform reciprocatory movements. During these movements the tines penetrating into the ground cause the respective soil cultivating means 28, (or 40) to perform a reciprocatory, rotary movement along the axes $b$ so that the un-worked soil and the lumps loosened by the reciprocating discs are crumbled by the tines along the natural fractural lines, while substantially no lateral displacement of earth is involved. The strip worked by the cultivating means 28 (or 40) is subsequently subjected to a last treatment by the working member 57 rotating a horizontal axis. As in the first embodiment, the arms 56 supporting the working member 57 may be pivoted to the frame beam 46 and there may be provided an adjusting device for adjusting and fixing the working member 57 in any selected one of a plurality of positions relative to the frame beam 46 so that the working depth of the soil cultivating means 28 (or 40) can be adjusted.

In the embodiment shown in FIG. 7 the machine has a hollow frame beam 58 extending transversely of the direction of travel A and holding near one end a gear box 59 in which an upright shaft 60 is journalled which projects out of the bottom of the frame beam 58. Near the other end of the frame beam 58 an upright shaft 61 is journalled and projects likewise out of the bottom of the beam 58. The shaft 61, as is shown schematically, is slidable, and then fixable, over a restricted distance in the direction of length of the frame beam. Each of the shafts 60 and 61 is provided at the lower end projecting from the frame beam 58 with a chain sprocket 62, around which a chain 63 is passed which constitutes an endless supporting member for the adjustable and exchangeable cultivating means 28 and/or 40, carried in the same manner as in the embodiment of FIG. 6. To this end, the chain 63 is provided with equidistant supports 64 on which the soil cultivating means are carried.

The supports 64 are held by guides 65 arranged on the beam 58.

At the ends of the beam 58, rearwardly extending arms 66 are inclined in downward direction, between the free ends of which arms a working members 67, extending transversely of the direction of travel A, is freely rotatable, the construction and disposition of which is completely the same as that of the working member 57 of FIG. 6. Also in this case the arms 66 may be adjustable in a direction of height.

Inside the gear box 59 the shaft 60 is drivably connected through a bevel gear wheel transmission with one end of a shaft 68, journalled in the beam 58. The shaft 68 is located by its other end in the gear box 69 near the center of the beam 58. Inside the gear box 58 the shaft 68 is drivably connected through a bevel gear wheel transmission with a shaft 70, which as illustrated is coupled via an auxiliary shaft 71 with the power take-off shaft of a tractor. By means of supports 72 and 73 a trestle 74 is carried on the beam 58 for attaching the machine to the three-point lift of the tractor.

The operation of the machine described above corresponds with that of FIG. 6, but with this machine an endless, elongated working member is provided which is equipped with soil cultivating means 28 and/or 40, which member is driven via the transmission described above in the direction of the arrow D, while the cultivating means in operation rotate about their respective axes $b$ as indicated by the arcuate arrows in FIG. 6.

While various features of the soil cultivating machines that have been described, and that are illustrated in the drawings, will be set forth in the following claims as inventive features, it is to be noted that the invention is not necessarily limited to these features and that is encompasses all of the features that have been described both individually and in various combinations.

What we claim is:

1. A soil cultivating machine comprising a frame and at least one soil working member being supported on said frame, said soil working member being rotatable about at least one upwardly extending axis and driving means connected to rotate said soil working member about that axis, tined cultivating means being rotatably mounted on said soil working member and spaced from said axis, and said cultivating means being freely rotatable about a further axis, an adjusting device connecting said cultivating means to said member and said cultivating means being pivotable to a plurality of freely rotatable working positions above a pivot shaft of said adjusting device, said pivot shaft extending in a non parallel direction with respect to the axis of rotation of the soil working member, a support connected to said soil cultivating means and journalled to turn about said pivot shaft, said cultivating means being fixable in any one of a plurality of different working positions relative to the remainder of said soil working member about said pivot shaft, a part and a further similar part being positioned one on each side of an arm of said soil working member and pivotable on said arm, said part and further part being fixable in a number of chosen positions with respect to said arm.

2. A soil cultivating machine, as claimed in claim 1, wherein said further axis extends in an upward direction and in at least one working position of said soil cultivating means can be positioned to extend substantially parallel to the axis of rotation of said soil working member.

3. A soil cultivating machine as claimed in claim 1, wherein said pivot shaft extends tangentially to a circle centered on said axis of rotation.

4. A soil-cultivating machine as claimed in claim 1, wherein said part and cultivating means are fixable together in any one of five different positions, said part being connected to a sleeve in which a shaft of said soil-cultivating means is journalled for free rotation.

5. A soil-cultivating machine as claimed in claim 1, wherein, viewed in a direction at right angles to its rotary axis, said soil-cultivating means comprises at least three tines having upper ends that extend towards said rotary axis.

6. A soil-cultivating machine as claimed in claim 5, wherein an upper portion of at least one tine merges into a lower operative portion through a curved portion, said lower portion extending in a straight, downwardly extending direction, said straight portion extending substantially parallel to said rotary axis and said upper portion being inclined upwardly and away from said operative portion.

7. A soil-cultivating machine as claimed in claim 6, wherein said operative portion is at an angle to a plane passing through the longitudinal center line of said upper portion and extends generally parallel to said rotary axis, said operative portion extending in a trailing position with respect to the normal direction of operative rotation of said soil-cultivating means.

8. A soil-cultivating machine comprising a frame and at least one soil-working member being supported on said frame, said soil-working member being rotatable about at least one upwardly extending rotary axis and driving means connected to rotate said soil-working member about that axis, cultivating means being rotatable mounted on said soil-working member and spaced from said rotary axis, sid cultivating means being freely rotatable about a further, upwardly extending axis that is defined by a shaft, said cultivating means comprising a plurality of tines having elongated upper ends that extend upwardly, means adjusting the relative position of said shaft and the working position of said cultivating means, said soil-cultivating means comprising a plurality of arms that are inclined downwardly and away from said shaft, the outer free ends of said arms having corresponding downwardly extending tines secured thereon and said ajustment means including a pivot that is positioned nearer said rotary axis than said shaft of the cultivating means.

9. A soil-cultivating machine as claimed in claim 8, wherein a plurality of soil-cultivating means are mounted on said soil-working member and said working member comprises a support with three equally spaced-apart support arms, a soil-cultivating means being secured to each of said arms, said three arms extending substantially radially and straight from the axis of rotation of said working member and each soil-cultivating means being journalled for free rotation adjacent the outer end of its arm.

10. A soil-cultivating machine as claimed in claim 8, wherein said pivot is located on the lower side of a corresponding support arm of said working member and a fixing pin of said adjusting means is positioned on the top side of said arm.

11. A soil cultivating machine as claimed in claim 8, wherein the longitudinal center lines of said arms are each at an angle of about 30° to said rotary shaft.

12. A soil cultivating machine as claimed in claim 11, wherein said tines each have an upper portion secured in a holder on one of said arms, the longitudinal center line of each holder extending at an acute angle to a lower operative portion of the tine held therein, said operative portion extending in a trailing position with respect to the normal direction of rotation of said soil cultivating means.

13. A soil cultivating machine as claimed in claim 8, wherein said arms extend generally radially from said rotary shaft.

14. A soil cultivating machine as claimed in claim 8, wherein there are two working members that are rotatable about upwardly extending axes in opposite directions, each working member having soil cultivating means positioned to work overlapping strips of soil.

15. A soil cultivating machine as claimed in claim 8, wherein said working member is elongated in shape and extends transverse to the direction of travel.

* * * * *